(12) United States Patent
Wang et al.

(10) Patent No.: US 8,750,113 B2
(45) Date of Patent: Jun. 10, 2014

(54) METHODS FOR MEASURING CELL LOAD FOR ADAPTIVE RATE SERVICES AND RELATED SYSTEMS AND COMPUTER PROGRAM PRODUCTS

(75) Inventors: Min Wang, Lulea (SE); Jonas Pettersson, Lulea (SE); Stefan Wanstedt, Lulea (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 295 days.

(21) Appl. No.: 13/280,592

(22) Filed: Oct. 25, 2011

(65) Prior Publication Data

US 2013/0100806 A1   Apr. 25, 2013

(51) Int. Cl.
| H04L 12/26 | (2006.01) |
| H04J 1/16 | (2006.01) |
| G08C 15/00 | (2006.01) |
| G06F 11/00 | (2006.01) |
| G01R 31/08 | (2006.01) |

(52) U.S. Cl.
USPC ............ 370/232; 370/230; 370/252; 370/358

(58) Field of Classification Search
USPC ................. 370/229–232, 235–252, 332–444; 709/224–231; 455/450–452
See application file for complete search history.

(56) References Cited

U.S. PATENT DOCUMENTS

| 6,167,030 | A  | * | 12/2000 | Kilkki et al. ................... 370/236 |
| 7,346,045 | B2 | * | 3/2008  | Montes Linares ............ 370/352 |
| 7,693,057 | B2 | * | 4/2010  | Kilkki ......................... 370/230.1 |
| 7,899,011 | B2 | * | 3/2011  | Petrovic et al. ............... 370/329 |
| 8,175,074 | B2 | * | 5/2012  | Ludwig et al. ................ 370/348 |
| 8,189,596 | B2 | * | 5/2012  | Rasanen .................. 370/395.21 |
| 8,223,758 | B2 | * | 7/2012  | Eriksson ...................... 370/358 |
| 8,422,373 | B2 | * | 4/2013  | Alanara ........................ 370/235 |
| 2006/0050637 | A1 | * | 3/2006 | Wigard et al. ................ 370/230 |
| 2010/0240385 | A1 | * | 9/2010 | Lohr et al. ................. 455/452.2 |

FOREIGN PATENT DOCUMENTS

WO    WO 2008/055936 A1    5/2008

OTHER PUBLICATIONS

Samuli Aalto et al., "Combining age-based and channel-aware scheduling in wireless systems," Helsinki University of Technology, Feb. 12, 2008.
LTE: Evolved Universal Terrestrial Radio Access Network (E-UTRAN); Layer 2—Measurements: "ETSI TS 136 314 v8.1.0", Apr. 2009.
Santitoro, Ralph, "Bandwidth profiles for Ethernet services," Annual Review of Communications, National Engineering Consortium, Chicago, IL, US, vol. 58, Jan. 1, 2005.
Notification of Transmittal of the International Search Report and the Written Opinion of the International Searching Authority, or the Declaration, PCT/IB2012/053096, Oct. 1, 2012.

* cited by examiner

*Primary Examiner* — M. Phan
(74) *Attorney, Agent, or Firm* — Myers Bigel Sibley & Sajovec

(57) ABSTRACT

Methods of load measurement for rate adaptive services are provided in a wireless communications network. The method includes receiving a plurality of packets associated with a bearer; calculating a measured bit rate for the plurality of packets received; and marking each of the plurality of packets received with information associated with the calculated measured bit rate, wherein the marked packets are used as input for admission control, congestion control and/or scheduling schemes for the wireless communications network. Related systems and computer program products are also provided.

24 Claims, 9 Drawing Sheets

METHODS FOR MEASURING CELL LOAD FOR ADAPTIVE RATE SERVICES AND RELATED SYSTEMS AND COMPUTER PROGRAM PRODUCTS

FIELD

Various embodiments described herein relate to radio frequency communications and, more particularly, to methods of controlling congestion in wireless communications networks and devices and related computer program products.

BACKGROUND

In a typical cellular radio system, wireless terminals (also known as mobile stations and/or user equipment units (UEs)) communicate via a radio access network (RAN) to one or more core networks. User equipment units (UEs) may be, for example, mobile telephones ("cellular" telephones), desktop computers, laptop computers, tablet computers, and/or any other devices with wireless communication capability to communicate voice and/or data with a radio access network.

The radio access network covers a geographical area which is divided into cell areas, with each cell area being served by a base station, for example, a radio base station (RBS), which in some networks is also called "NodeB" or, in Long Term Evolution, an eNodeB. A cell is a geographical area where radio coverage is provided by the radio base station equipment at a base station site. Each cell is identified by an identity within the local radio area, which is broadcast in the cell. The base stations communicate over the air interface operating on radio frequencies with the UEs within range of the base stations.

In some versions of the radio access network, several base stations are typically connected, for example, by landlines or microwave, to a radio network controller (RNC). The radio network controller, also called a base station controller (BSC), supervises and coordinates various activities of the base stations connected thereto. The radio network controllers are typically connected to one or more core networks, typically through a gateway.

Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. The Universal Terrestrial Radio Access Network (UTRAN) is essentially a radio access network using wideband code division multiple access for user equipment units (UEs). The Third Generation Partnership Project (3 GPP) has undertaken to evolve further the UTRAN and GSM based radio access network technologies.

Specifications for Evolved Universal Terrestrial Radio Access Network (E-UTRAN) are ongoing within the 3rd Generation Partnership Project (3 GPP). Another name used for E-UTRAN is the Long Term Evolution (LTE) Radio Access Network (RAN). Long Term Evolution (LTE) is a variant of a 3GPP radio access technology wherein the radio base station nodes are connected directly to a core network rather than to radio network controller (RNC) nodes. In general, in LTE the functions of a radio network controller node are performed by the radio base stations nodes. As such, the radio access network of an LTE system has an essentially "flat" architecture comprising radio base station nodes without reporting to radio network controller nodes.

The evolved UTRAN comprises evolved base station nodes, for example, evolved NodeBs or eNBs, providing user-plane and control-plane protocol terminations toward the UEs. The eNB hosts the following functions (among other functions not listed): (1) functions for radio resource management (for example, radio bearer control, radio admission control), connection mobility control, dynamic resource allocation (scheduling); (2) mobility management entity (MME) including, for example, distribution of paging message to the eNBs; and (3) User Plane Entity (UPE), including IP Header Compression and encryption of user data streams; termination of U-plane packets for paging reasons, and switching of U-plane for support of UE mobility. The eNB hosts the PHYsical (PHY), Medium Access Control (MAC), Radio Link Control (RLC), and Packet Data Control Protocol (PDCP) layers that include the functionality of user-plane header-compression and encryption. The eNodeB also offers Radio Resource Control (RRC) functionality corresponding to the control plane. The eNodeB performs many functions including radio resource management, admission control, scheduling, enforcement of negotiated UL QoS, cell information broadcast, ciphering/deciphering of user and control plane data, and compression/decompression of DL/UL user plane packet headers.

The LTE standard is based on multi-carrier based radio access schemes such as Orthogonal Frequency-Division Multiplexing (OFDM) in the downlink and SC-FDMA in the uplink. Orthogonal FDM's (OFDM) spread spectrum technique distributes the data over a large number of carriers that are spaced apart at precise frequencies. This spacing provides the "orthogonality" in this technique which reduces interference. The benefits of OFDM are high spectral efficiency, resiliency to RF interference, and lower multi-path distortion.

As noted above, in the E-UTRAN Radio Access Network scheme, the management of radio resource such as time, frequency and spatial resources takes place in the individual base stations (or cells). Each eNodeB base station therefore includes a Radio Resource Management (RRM) unit for performing management of radio resources. These RRM units typically operate independently from each other, except for very limited exchange of information, such as traffic load condition.

Referring now to FIGS. 1A and 1B, a schematic diagram of a conventional wireless network 10 will be discussed. Referring first to FIG. 1A, in a conventional wireless network 10, a base station 12 communicates with a core network 18 through a gateway 16. Communications between the base station 12 and the gateway 16 are carried over a transport network 20, which may include wired and/or wireless communication links. The base station 12 also communicates with one or more user equipment units (UEs) 14 through a radio access network (RAN) 30. Signals, such as voice and/or data signals, transmitted by the UE 14 are carried over the RAN 30 to the base station 12, and then over the transport network 20 to the gateway 16, for transmission to the core network 18.

As further illustrated in FIGS. 1A and 1B, a conventional wireless network 10 may include a plurality of base stations 12 that provide radio communication services for a plurality of user equipment units (UE) 14 within their respective geographic service areas (cells). Each base station 12 includes an associated RRM unit 24, and each of the base stations 12 communicates with the core network 18 through a gateway 16 via a transport network. At the base stations 12, data received from and to be transmitted to the User Equipment units (UE) 14 is transported to and from the core network 18 through a transport network 20 that may include a variety of transport links 22, such as optical fiber, microwave and/or copper wires.

Conventionally, these various transport links 22 are point to point connections, as shown in FIG. 1B. Each base station 12 generates or consumes a certain amount of data that may vary as traffic condition changes over time. Thus, the point to point links 22 are designed to accommodate the peak data rates a base station generates or consumes.

The output of the RRM unit 24 in a conventional radio access network is a schedule, which typically defines an allocation of time, frequency and/or spatial resources to the UEs 14 in the system, and the Modulation and Coding Scheme (MCS) the given resource can support.

FIG. 2 illustrates hypothetical resource allocation schedules for three different cells, Cell 0, Cell 1 and Cell 2. For clarity of illustration, the spatial dimension is omitted from the schedules shown in FIG. 2. However, it will be appreciated that the spatial dimension could include, for example, a particular sector of a cell in which resources are allocated to a UE 14.

In the example shown in FIG. 2, three frequencies (f1 to f3) and four time slots (TS1 to TS4) are available for allocation to various UEs. For example, in Cell 0, UE0 is allocated frequency f3 for two time slots, TS1 and TS2, and is instructed to use modulation and coding scheme MCS1 within those resources. UE1 is allocated frequency 12 for two time slots, TS1 and TS2, and is instructed to use modulation and coding scheme MCS7 within those resources. UE2 is allocated frequencies 12 and f3 for one time slot, TS3, and is instructed to use modulation and coding scheme MCS2 within those resources, etc.

There is one such resource allocation schedule for the uplink (i.e., for communications from the UE 14 to the base station 12) and another for downlink (i.e., for communications from the base station 12 to the UE 14), since the transport resource for the two link directions is statically allocated in the conventional network.

As long as the transport network links 22 are dimensioned to carry the peak traffic that the base stations 12 in the RAN may generate, the transport and radio access networks operate independently. The designs of the two networks are also disjoint.

In practice, the traffic generated or consumed by base stations 12 may vary over time and locations as users move. Therefore, not all base stations 12 may be operating at a peak rate at a given point in time. The statically dimensioned transport network 20 is not very efficient, as there may be excess capacity that may not be fully utilized at any given time.

Conventional load measurement methods work well for guaranteed bit rate (GBR) traffic having a fixed bit rate. However, many services offered on user equipment are not GBR fixed rate services, but adaptive rate services, for example, http streaming. Accordingly, accurate load measurement for GBR traffic with adaptive bit rates may be desired.

SUMMARY

Some embodiments of the present invention provide methods of load measurement for rate adaptive services in a wireless communications network. The method includes receiving a plurality of packets associated with a bearer; calculating a measured bit rate for the plurality of packets received; and marking each of the plurality of packets received with information associated with the calculated measured bit rate. The marked packets are used as input for admission control, congestion control and/or scheduling schemes for the wireless communications network. The load measurement may be performed only based on the marked packets, for example, packets for which the measured bit rate is less than GBR. Thus, methods in accordance with some embodiments may measure the load for cells or bearers carrying rate adaptive GBR services to offer a more accurate load measurement and, therefore, increase the likelihood, or possibly ensure, that admission control, congestion control, or even a scheduler make correct decisions.

Further embodiments of the present invention provide congestion control systems for rate adaptive services in a wireless communications system. The congestion control system includes a radio transceiver configured to receive a plurality of packets associated with a bearer; and a processor configured to calculate a measured bit rate for the plurality of packets received; and mark each of the plurality of packets with information associated with the calculated measured bit rate. The marked packets are used as input for admission control, congestion control and/or scheduling schemes for the wireless communications network.

Still further embodiments of the present invention provide computer program products for load measurement for rate adaptive services in a wireless communications network. The computer program product includes a non-transitory computer readable storage medium including computer readable program code embodied therein. The computer readable program code includes computer readable program code configured to receive a plurality of packets associated with a bearer; computer readable program code configured to calculate a measured bit rate for the plurality of packets received; and computer readable program code configured to mark each of the plurality of packets received with the information associated with the calculated measured bit rate. The marked packets are used as input for admission control, congestion control and/or scheduling schemes for the wireless communications network.

Other methods, systems and computer program products according to embodiments of the invention will be or become apparent to one with skill in the art upon review of the following drawings and detailed description. It is intended that all such additional methods, intermediary devices and/or mobile communication modules be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Various embodiments of the present invention are directed to providing congestion control for user equipment (UE) units. As used herein, a "UE" refers to "mobile telephones ("cellular" telephones), desktop computers, laptop computers, tablet computers, and/or any other devices with wireless communication capability to communicate voice and/or data with a radio access network.

As discussed above, current load measurement methods work for guaranteed bit rate (GBR) traffic having a fixed bit rate. However, many current services are rate adaptive, for example, http streaming. Hence, the design of an accurate load measurement for GBR traffic types with adaptive rate would help improve accuracy, and thereby performance for load based admission control as well as congestion control schemes.

Applying the existing load measurement methods directly to rate adaptive services, would overestimate the load consumption in periods when the actual bit rate is over the GBR and underestimate the load consumption when the actual bit rate is lower than the GBR rate. Hence, admission control (AC) could make erroneous admission decisions according to these inaccurate measurements; for example, more users than the system can support may be admitted. Similarly, congestion control (CC) could also make improper decisions based on these inaccurate measurements; for example, users that should not be dropped may be dropped. These instances may lead to an unstable system and, therefore, a deteriorated user experience.

Accordingly, some embodiments of the present invention provide methods for measuring the load for cells or bearers carrying rate adaptive GBR services to provide a more accurate load measurement and, therefore, increase the likelihood that or possibly ensure that that admission control, congestion control, a scheduler and the like make more accurate decisions. As discussed below, the average bit rate is measured in time units of fixed interval. Within each interval, the received packets will be marked, for example, with a measured average bit rate or a flag indicative thereof. The load measurement is performed based on the marked GBR packets, i.e., packets for which the measured bit rate is less than GBR as will be discussed further below with respect to FIG. 3 through 16.

Figure 1A:
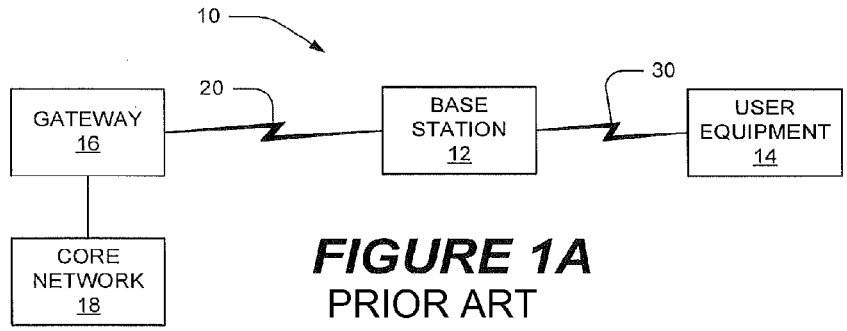
FIGS. 1A and 1B are schematic block diagrams illustrating conventional wireless networks.
Figure 1B:
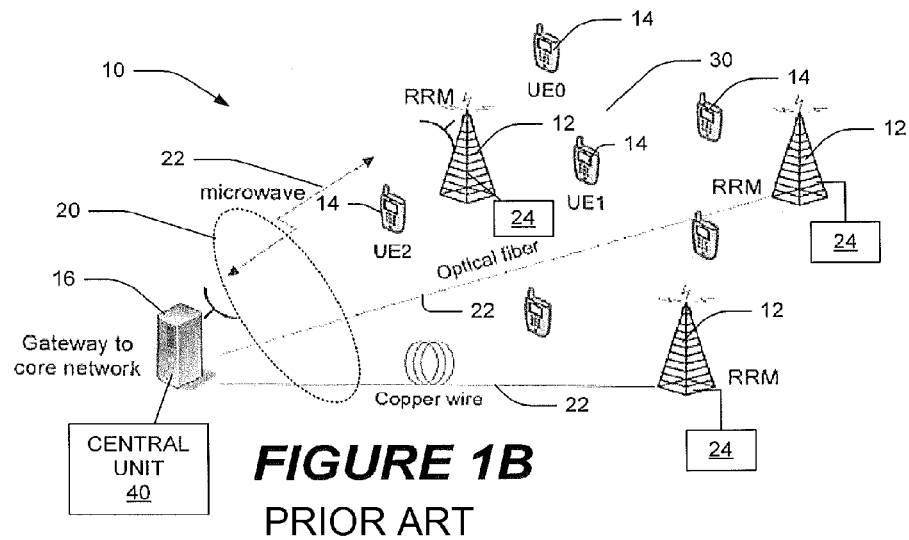
Figure 2:
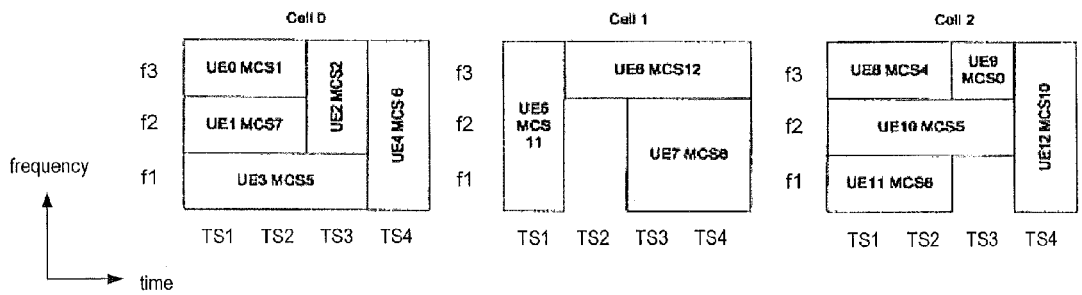
FIG. 2 is a block diagram illustrating hypothetical resource allocation schedules for the wireless networks of FIGS. 1A and 1B.
Figure 3:
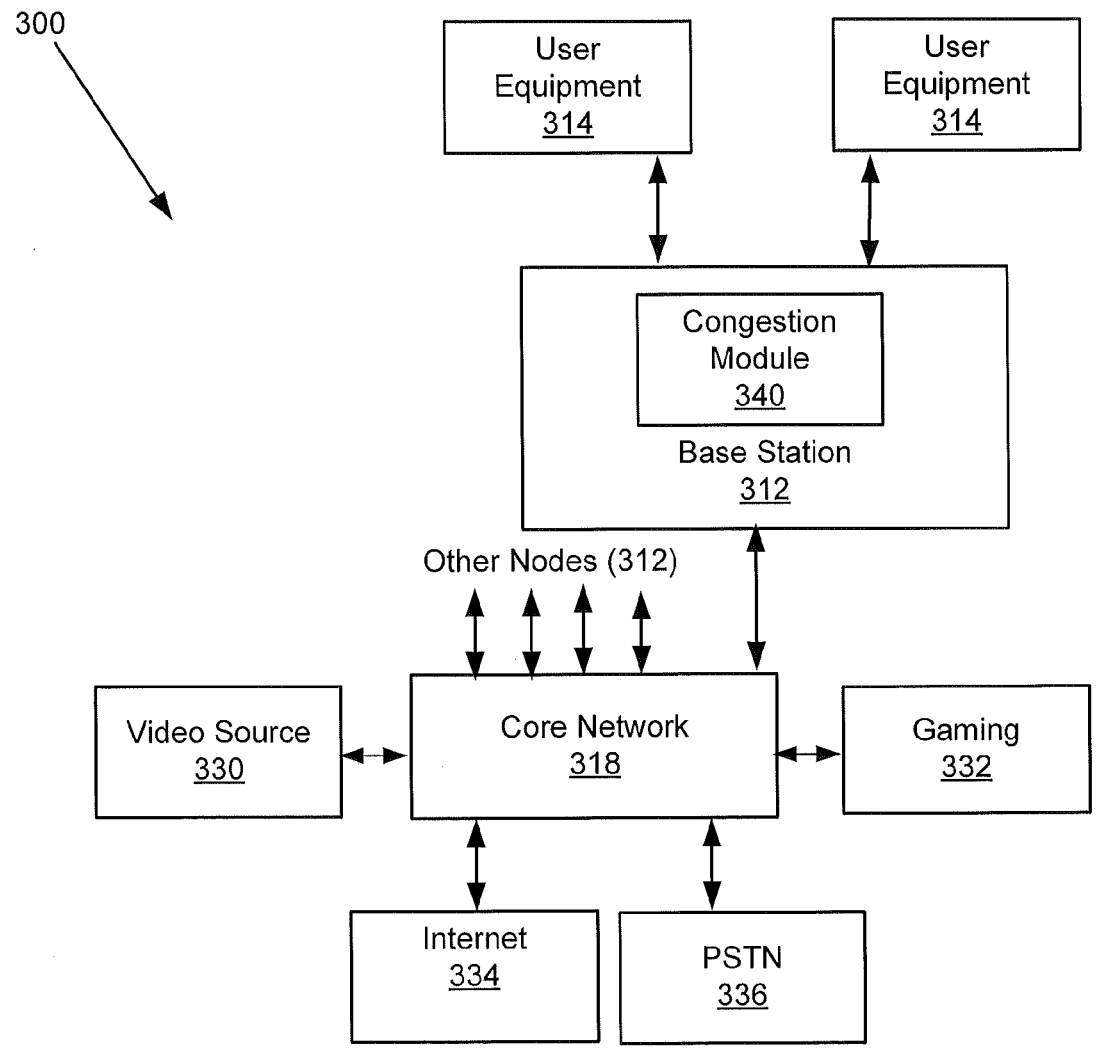
FIG. 3 is a block diagram illustrating a wireless communication system in accordance with some embodiments of the present invention.

Referring now to FIG. 3, a block diagram of a system 300 including a congestion module 340 in accordance with some embodiments of the present invention will be discussed. As illustrated in FIG. 3, a wireless communications network or system 300 may include a plurality of nodes, such as node 312 that wirelessly communicate with a plurality of user equipment (UE) units, collectively designated herein as 314, according to various embodiments described herein. The nodes 312 may be for various wireless technologies, for example, WLAN, LTE, 3G and the like. As further illustrated in FIG. 3, the system 300 further includes a core network 318 that connects the nodes 312 to services, such as the Internet 334, Video sources (HD TV, TVoD, VoD) 330, gaming resources 332, PSTN resources 336 and the like.

Figure 4:
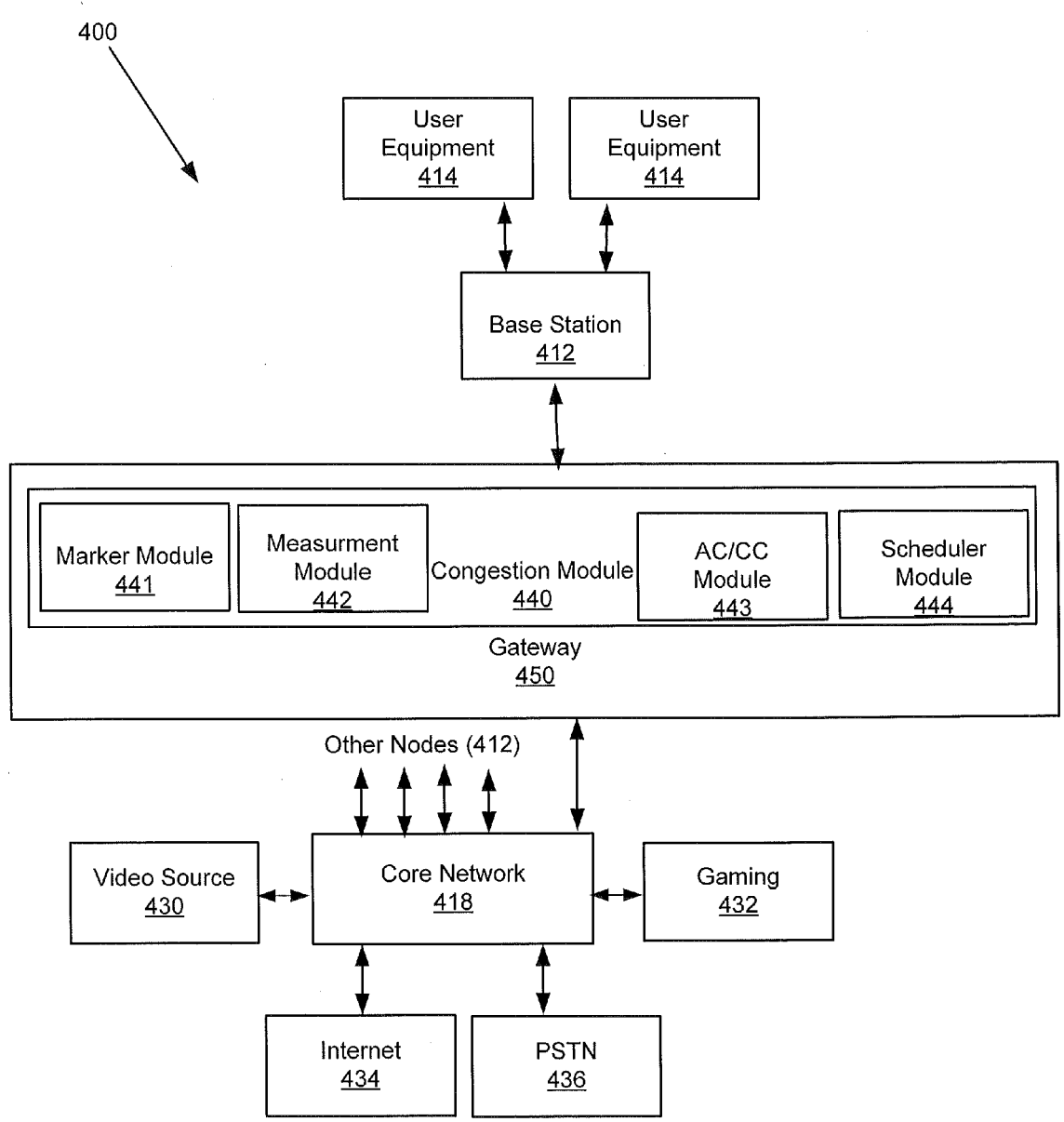
FIG. 4 is a block diagram illustrating a wireless communication system in accordance with some embodiments of the present invention.

As further illustrated in FIG. 3, the base station node 312 may include the congestion module 340 configured in accordance with various embodiments of the present invention. Although, embodiments of the present invention illustrate the congestion module 340 in the base station node 312, embodiments of the present invention are not limited to this configuration. For example, as illustrated in FIG. 4, the congestion module 440 may be provided in a gateway 450 that connects the nodes 412 to the core network 418. It will be understood that the congestion module 340, 440 may be positioned anywhere in the packet path without departing from the scope of the present invention.

It will be further understood that although the congestion module 340 is illustrated as a single module, the congestion module 340, 440 may include one or more than one module. As illustrated in FIG. 4, the congestion module 440 may include a marker module 441, a measurement module 442, an admission/congestion module 443, a scheduler module 444 and the like. The congestion module 440 may be configured to perform one or more of the functions of these modules or the modules may be broken up into two or more modules without departing from the scope of the present invention.

Figure 5:
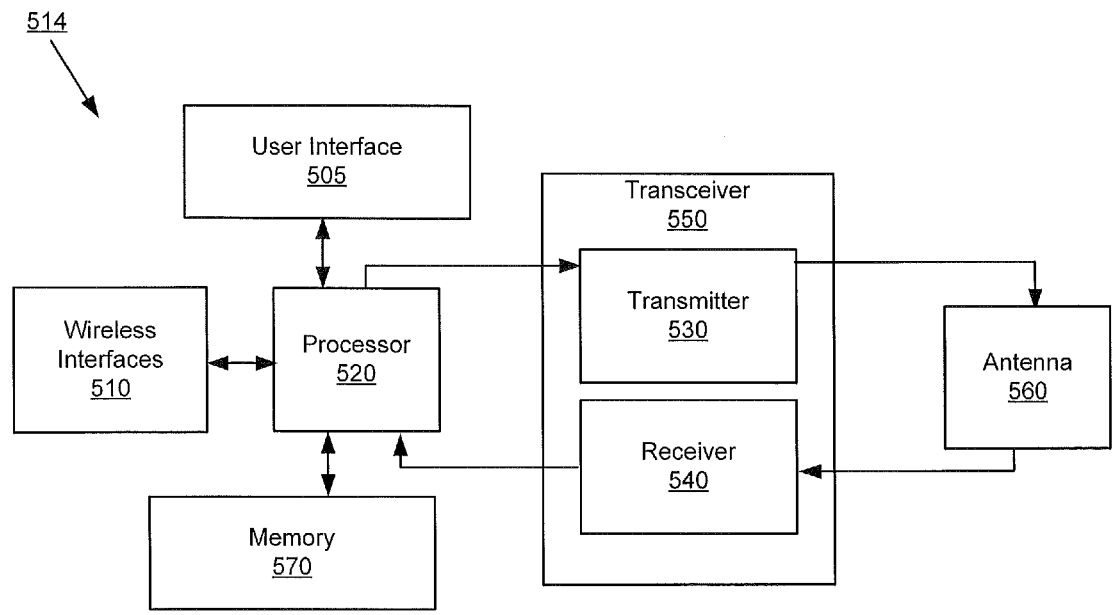
FIG. 5 is a block diagram illustrating a user equipment unit in accordance with some embodiments of the present invention.

FIG. 5 is a block diagram illustrating a user equipment unit 514 in accordance with various embodiments of the present invention. As illustrated, the user equipment unit 514 includes at least one wireless interface 510, a processor 520, a memory 570, a transmitter 530, a receiver 540, an antenna 560 and a user interface 505. The transmitter 530 and receiver 540 may be at least partially combined in a transceiver 550. The antenna 560 may include one or more antennas that communicate with the transceiver 550 through one or more antenna ports. The processor 520 may process voice/data communications transmitted through the transmitter 530 and antenna 560 and received through the antenna 560 and receiver 540. The user interface 505 may include one or more speakers, microphones, keypads, displays, touch-sensitive displays, etc., to support radiotelephone voice communication, Internet browsing, text messaging, email, etc. The receiver 540 and the antenna 560 may be further configured to receive GPS and/or other positioning signals, and the processor 520 may be configured to process these positioning signals and/or to transmit these signals through the transmitter 530 and antenna 560 to the node 312, 412. Instructions and/or data that are used by the processor 520 may be stored in one or more memories 570. User equipment units 314, 414, 514 may send and receive packets that are controlled in accordance with congestion, acceptance and/or scheduling schemes in accordance with some embodiments of the present invention.

Figure 6:
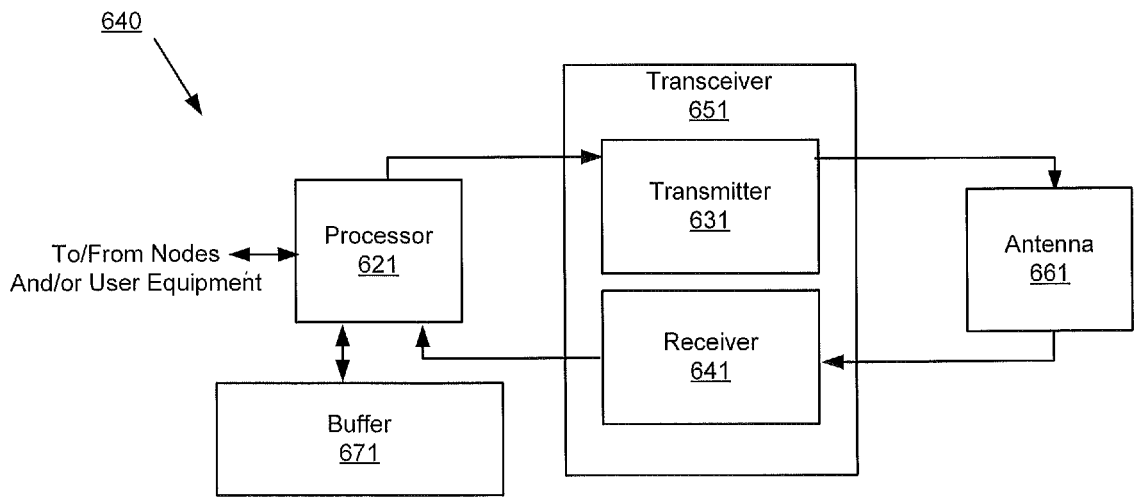
FIG. 6 is a block diagram illustrating a congestion module in accordance with some embodiments of the present invention.

FIG. 6 is a block diagram illustrating a congestion module 640 in accordance various embodiments discussed herein. As illustrated in FIG. 6, the congestion module may include a processor 621, a transmitter 631, a receiver 641, a buffer 671 and an antenna 661. The transmitter 631 and receiver 641 may be at least partially combined in a transceiver 651. The antenna 661 may include one or more antennas that communicate with the transceiver 651 through one or more antenna ports. The processor 621 may be coupled to the core network and/or to other nodes. The processor 621 may also process voice/data communication transmitted through the transmitter 631 and antenna 661, and received through the antenna 661 and receiver 641 to support communication with a plurality of user equipment 314, 414 and 514.

As discussed above, the congestion module 640 may be included in any portion of the packet path without departing from the scope of the present invention. Referring now to FIGS. 4 and 6, the congestion module 640 may include various other modules, for example, the marker module 441, the measurement module 442, the AC/CC module 443 and/or the scheduling module 444. The marker module 441 is configured to mark packets based on bit rate. It will be understood that bit rate can be calculated in many different ways, for example, periodic, moving average, token bucket algorithm and the like. As discussed above, the marker module 441 may be located anywhere along the packet path, for example in the core network 418, the base station node 412, the gateway 450, the congestion module 440 and the like.

Figure 7:
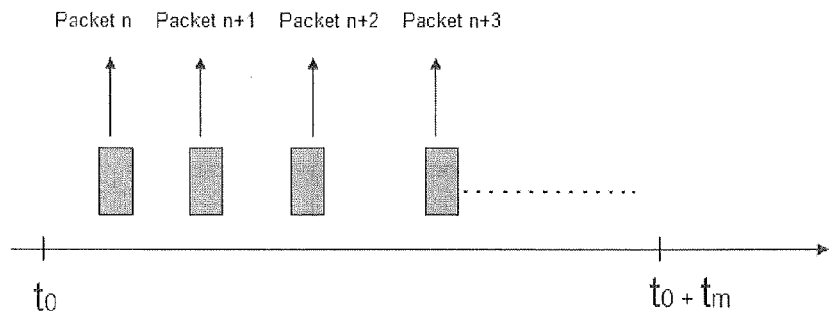
FIG. 7 is a block diagram illustrating methods of measuring bit rates in accordance with some embodiments of the present invention.

Referring now to FIG. 7, a method of measuring bit rate in accordance with some embodiments will be discussed. In some embodiments, the bit rate measurement will be performed per bearer. Within each fixed time period, all arrived packets for a specific bearer may be summarized. It may be assumed that n packets arrived within the time period of $t_m$ seconds. Hence, the measured bit rate can be calculated using the following Equation:

$$R_m = \Sigma L_i / t_m \ (i=1, \ldots n) \quad (1)$$

where Li denotes the size of the i-th packet. Furthermore, as part of measuring the bit rate, particular embodiments may feed the size of the arrived packets for a particular bearer to a filter designed to provide a moving average of the size (for example, an exponentially weighted moving average of the size). For example, in particular embodiments, the method may include feeding the packet sizes, Li, to a filter, such that the packet sizes are filtered to ensure that $R_m = a*L_i + (1-a)R_{m-1}$.

In embodiments targeted to measure the average bit rate of the service, radio link control (RLC) or hybrid automatic repeat request (HARQ) retransmissions may not be counted in the estimation. For example, assuming the downlink bit rate of a service at Node side is measured, all IP packets for a bearer received from the core network will be summed up. IP packet header overhead will be deduced.

Figure 8:
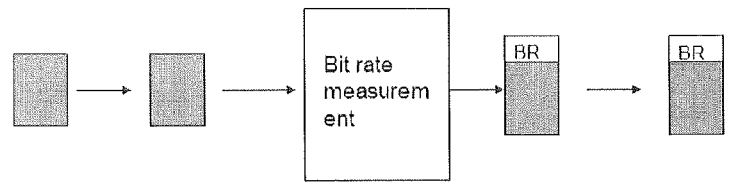
FIG. 8 is a block diagram illustrating methods of marking packets in accordance with some embodiments of the present invention.

The packets are marked with bit rate information, for example, the packets may be marked with the actual calculated bit rate; however, embodiments of the present invention are not limited to this configuration. For example, in particular embodiments, the calculated bit rate may be compared with the GBR. In such embodiments, the "mark" may be a flag indicating that the calculated bit rate does not conform with the GBR (e.g., the calculated bit rate is higher or lower than the GBR, or exceeds or falls short of the GBR by some predefined amount) in some embodiments. In some embodiments, as illustrated in FIG. 8, all packets within each measurement period may be marked with the measured bit rate (BR) in a private format. It will be understood that this mark may only be used for the load measurement. In other words, before transmitting the marked packet to the terminal (downlink), or to the node (uplink) after the load measurement, the bit rate mark (BR) may be removed.

The measurement module 442 may be configured to calculate load measurements, the details of which will be discussed further below. These load measurements may be provided to the AC/CC module 443 to provide the relevant control and/or the scheduling module 444 to use for scheduling future packets.

Examples of applying the load measurement to acceptance control and/or congestion control schemes will now be discussed. The conventional method for cell load estimation is expressed below in Equation (2) based on physical resource block (PRB) consumption. The cell load is estimated based on the average number of PRBs used by the bearers. The average resource block usage is used. The resource block usage is:

$$\text{Ratio}_{PRB} = \Sigma G_i / G_{tot} \quad (2)$$

where Gi denotes the number of used PRBs for bearer i and Gtot is the number of the total available PRBs in a cell.

The sum of PRB consumption for GBR bearer is calculated as follows:

$$G_i = (\text{PRB consumption of packet } j)(j=1 \ldots K) \quad (3)$$

where Gi denotes the number of used PRBs for bearer i. In each measurement period, the total PRB consumption will be summed up for a specific bearer.

According to some embodiments of the present invention, a modified sum of PRB consumption for rate adaptive services is calculated as follows:

$$G_i = \Sigma(\text{PRB consumption of packet } j \text{ if } BR_j <= GBR) \\ (j=1 \ldots K) \quad (4)$$

where $BR_j$ is the marked bit rate for packet j, and $GBR_i$ is the guaranteed bit rate for bearer i, which is the required bit rate need to fulfill the guaranteed quality of service QoS.

According to further embodiments of the present invention, cell load may be measured by calculating the PRB consumption using the existing method set out in Equations (2) and (3) above. However, for adaptive rate services, the PRB consumption may be modified as follows:

$$\text{Modified Ratio}_{PRB} = \text{Ratio}_{BR} \times \text{Ratio}_{PRB} \quad (5)$$

$$\text{Ratio}_{BR} = \begin{cases} 1 & \text{if } BR_i <= GBR_i \\ GBR_i / BR_i & \text{if } BR_i > GBR_i \end{cases} \quad (6)$$

where BRi is the measured bit rate for bearer i and $GBR_i$ is the guaranteed bit rate for bearer i.

Figure 9:
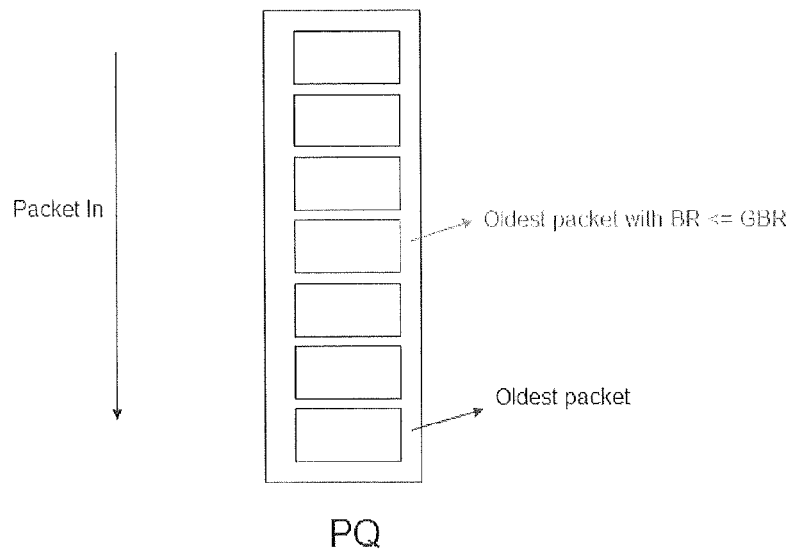
FIG. 9 is a block diagram illustrating methods of bearer congestion control in accordance with some embodiments of the present invention.

Referring now to FIG. 9, there are different alternatives to perform bearer based congestion control. For example, packet age based bearer congestion control or cost per bit based bearer congestion control. Embodiments of the present invention only discuss packet age based age congestion control. In particular, conventionally packet age may be defined as the queuing time for the oldest packet in the priority queue. The conventional bearer based congestion control defines a GBR bearer as congested if the packet age of the oldest packet in priority queue is over a predefined congestion threshold. As illustrated in 9, in accordance with some embodiments of the present invention, the oldest packet with the measured bit rate within GBR scope (BR<=GBR) is applied for bearer based congestion control.

Thus, the various embodiments of the present invention with respect to cell load measurement as well as bearer based congestion control provide low cost and easily implemented methods that provide accurate load estimation for rate adaptive services.

Figure 10:
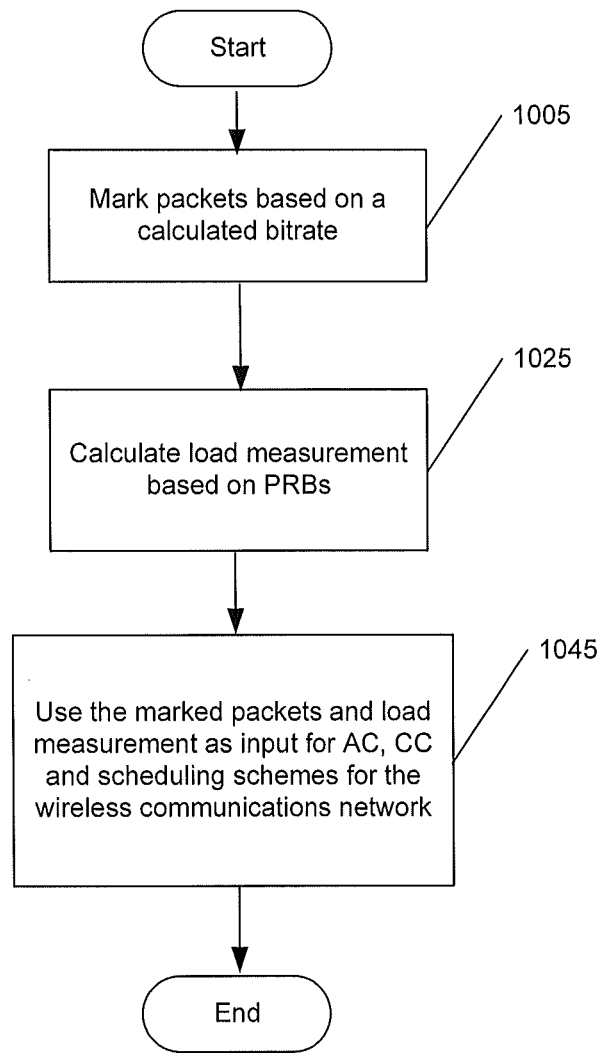
FIGS. 10-16 are flowcharts of operations that may be performed to assign radio resources in a wireless communications network in accordance with various embodiments of the present invention.

Referring now to FIGS. 10 through 16, flowcharts illustrating operations for load measurement for adaptive rate services in accordance various embodiments of the present invention will be discussed. Referring first to FIG. 10, operations begin at block 1005 by marking packets based on a calculated bit rate. As discussed above, it will be understood that the calculated bit rate can be calculated in any way known to those having skill in the art. For example, periodic, moving average, token bucket algorithm and the like. The packets may be marked anywhere along the packet path and may be performed at, for example, the core network, the base station node, the measurement module and the like without departing from the scope of the present application.

Furthermore, the "marking" in the packet itself does not have to be the actual calculated bit rate. The marking may include, for example, information associated with the calculated bit rate such as a flag indicating that the bit rate is higher or lower than the GBR. It will be further understood that the comparison with the GBR may be performed before or after the "marking" of the packet. Accordingly, in some embodiments of the present invention where the comparison is performed before the marking, the marking may only include a single bit.

Once the packet is marked (block 1005), the cell load measurement may be calculated, for example, as discussed above (block 1025). It will be understood that this measurement is closely related to the scheduler as the knowledge of how many PRBs each packet requires is needed. Finally, the marked packets and load measurements may be used in acceptance control and/or congestion control schemes for the wireless network (block 1045) and may also be used for scheduling of packets (block 1045).

Figure 11:
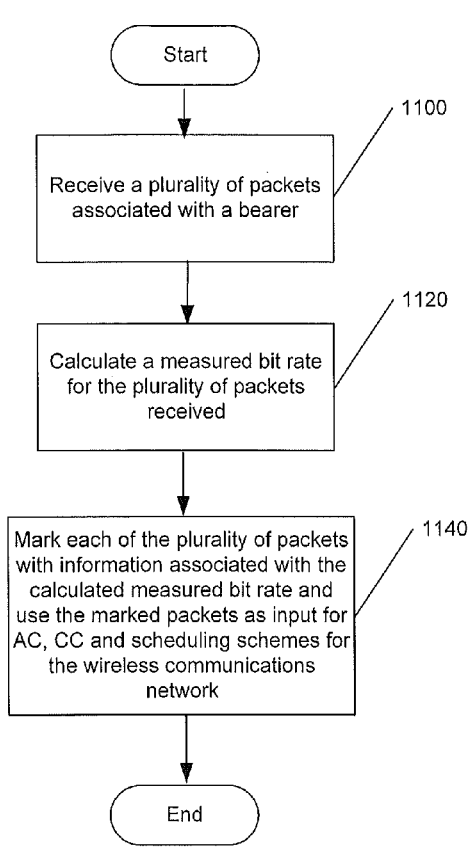

Referring now to FIG. 11, operations for load measurement for rate adaptive services in a wireless communications network begin at block 1100 by receiving a plurality of packets associated with a bearer. A measured bit rate for the plurality of packets received is calculated (block 1120). Each of the plurality of packets received is marked with information associated with the calculated measured bit rate (block 1140). As discussed above, the marking may include the actual calculated bit rate or a representation thereof, for example, a flag. The marked packets may be used as input for admission control, congestion control and/or scheduling schemes for the wireless communications network (block 1140).

Figure 12:
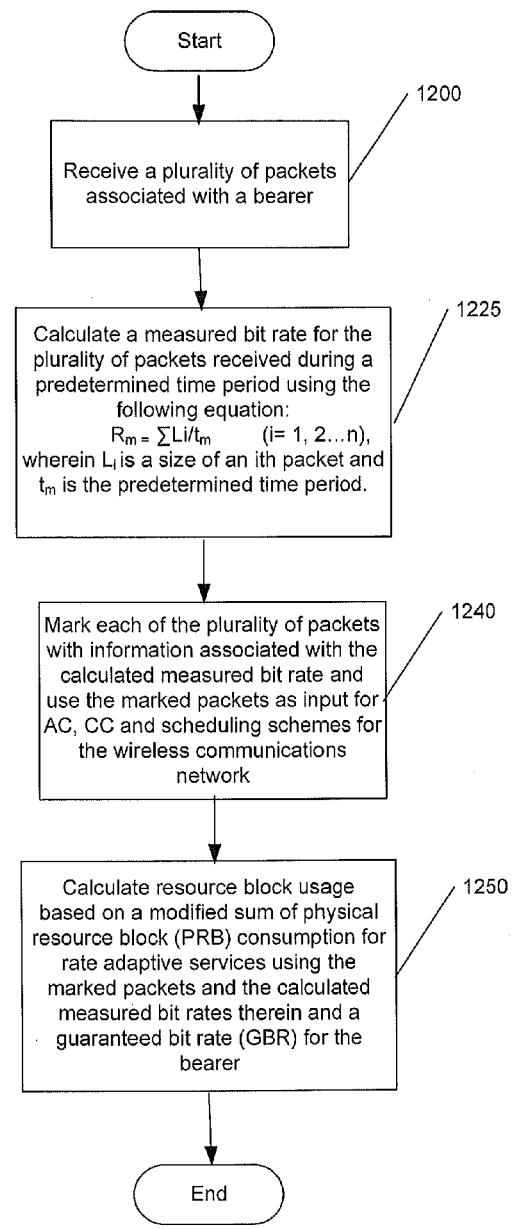

Referring now to FIG. 12, operations for load measurement for rate adaptive services in a wireless communications network begin at block 1200 by receiving a plurality of packets associated with a bearer. The measured bit rate ($R_m$) may be calculated for the plurality of packets received for a predetermined time period using the Equation (1) set out above (block 1225).

Each of the plurality of packets received is marked with information associated with the calculated measured bit rate (block 1240). As discussed above, the marking may include the actual calculated bit rate or a representation thereof, for example, a flag. The marked packets may be used as input for admission control, congestion control and/or scheduling schemes for the wireless communications network (block 1240). Resource block usage may be calculated based on a modified sum of physical resource block (PRB) consumption for rate adaptive services using the marked packets and the calculated measured bit rates therein and a guaranteed bit rate (GBR) for the bearer (block 1250).

Figures 13, 14:
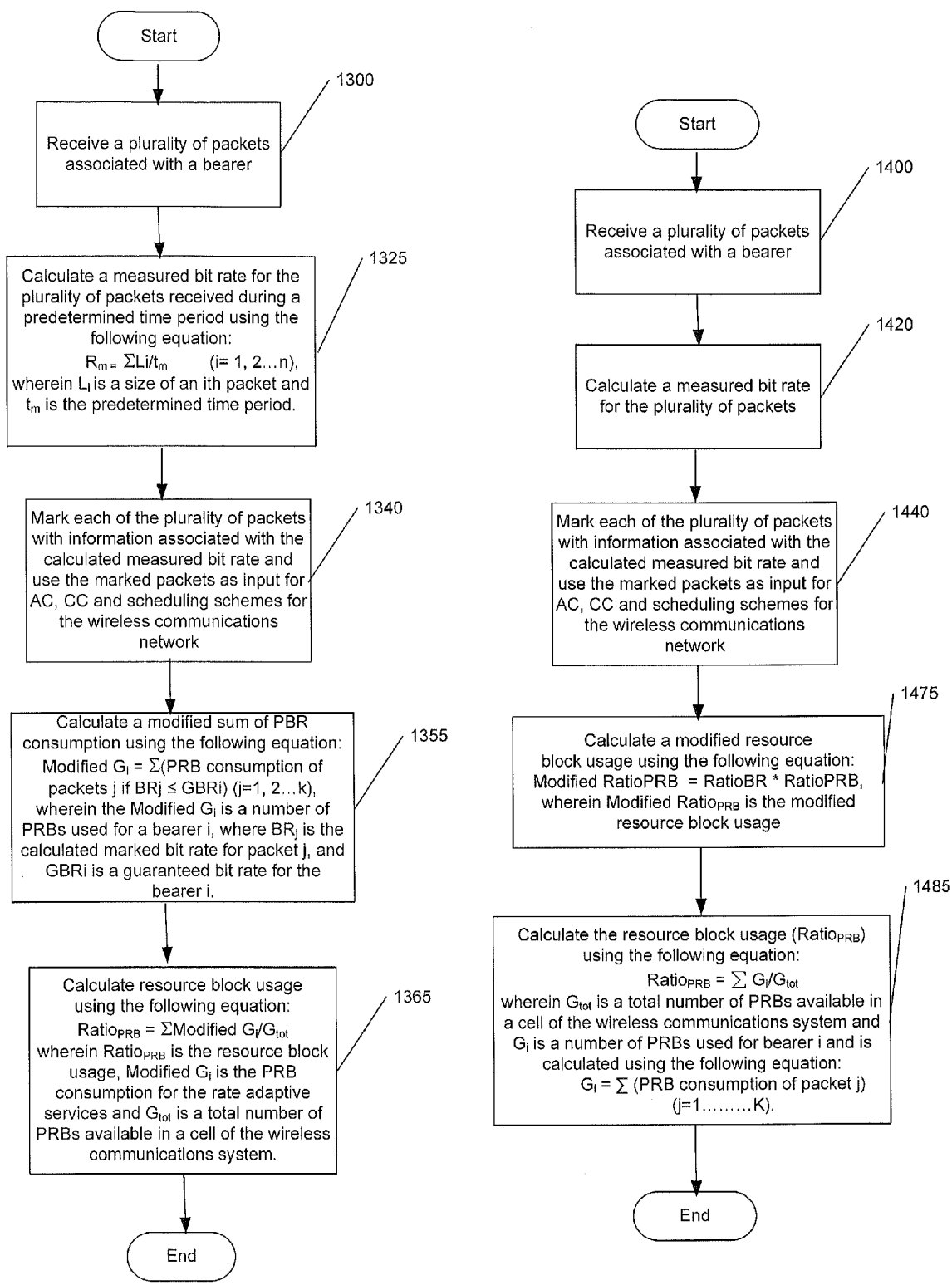

Referring now to FIG. 13, operations for load measurement for rate adaptive services in a wireless communications network begin at block 1300 by receiving a plurality of packets associated with a bearer. The measured bit rate ($R_m$) may be calculated for the plurality of packets received for a predetermined time period using Equation (1) set out above (block 1325).

Each of the plurality of packets received is marked with information associated with the calculated measured bit rate (block 1340). As discussed above, the marking may include the actual calculated bit rate or a representation thereof, for example, a flag. The marked packets may be used as input for admission control, congestion control and/or scheduling schemes for the wireless communications network (block 1340).

Operations proceed to block 1355 by calculating the modified sum of consumption using the Equation (4) set out above. In some embodiments, the GBRi may be a required bit rate needed to fulfill a guaranteed quality of service for bearer i. Operations proceed to block 1365 by calculating resource block usage using the Equation (2) set out above.

Referring now to FIG. 14, operations for load measurement for rate adaptive services in a wireless communications network begin at block 1400 by receiving a plurality of packets associated with a bearer. A measured bit rate for the plurality of packets received is calculated (block 1420). Each of the plurality of packets received is marked with information associated with the calculated measured bit rate (block 1440). As discussed above, the marking may include the actual calculated bit rate or a representation thereof, for example, a flag. The marked packets may be used as input for admission control, congestion control and/or scheduling schemes for the wireless communications network (block 1440).

Operations proceed to block 1475 by calculating a modified resource block usage using Equations (5) and (6) set out above. The resource block usage ($Ratio_{PRB}$) may be calculated using Equations (2) and (3) set out above (block 1485).

Figure 15:
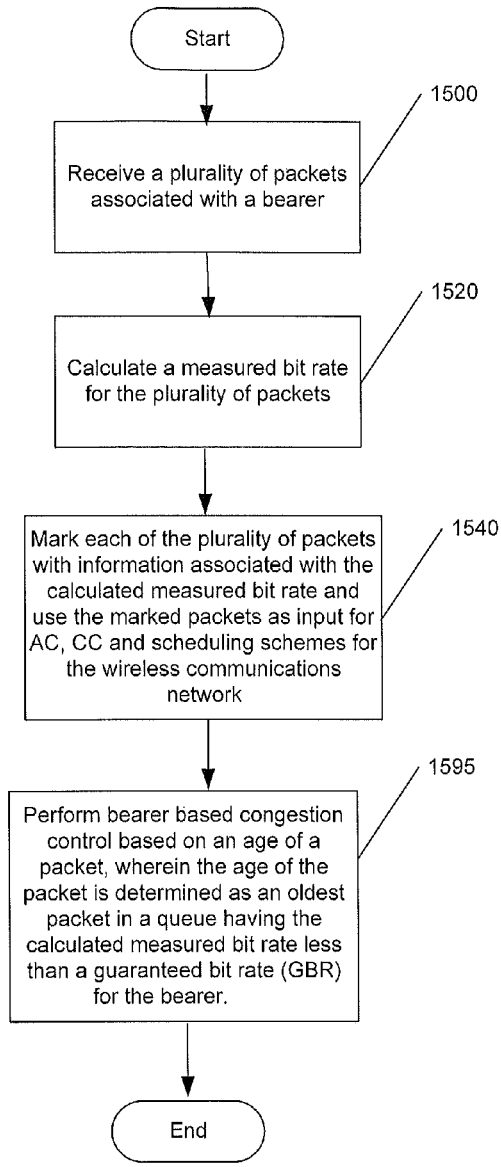

Referring now to FIG. 15, operations for load measurement for rate adaptive services in a wireless communications network begin at block 1500 by receiving a plurality of packets associated with a bearer. A measured bit rate for the plurality of packets received is calculated (block 1520). Each of the plurality of packets received is marked with information associated with the calculated measured bit rate (block 1540). As discussed above, the marking may include the actual calculated bit rate or a representation thereof, for example, a flag. The marked packets may be used as input for admission control, congestion control and/or scheduling schemes for the wireless communications network (block 1540). Bearer based congestion control may be performed based on an age of a packet, wherein the age of the packet is determined as an oldest packet in a queue having the calculated measured bit rate less than a guaranteed bit rate (GBR) for the bearer (block 1595).

Figure 16:
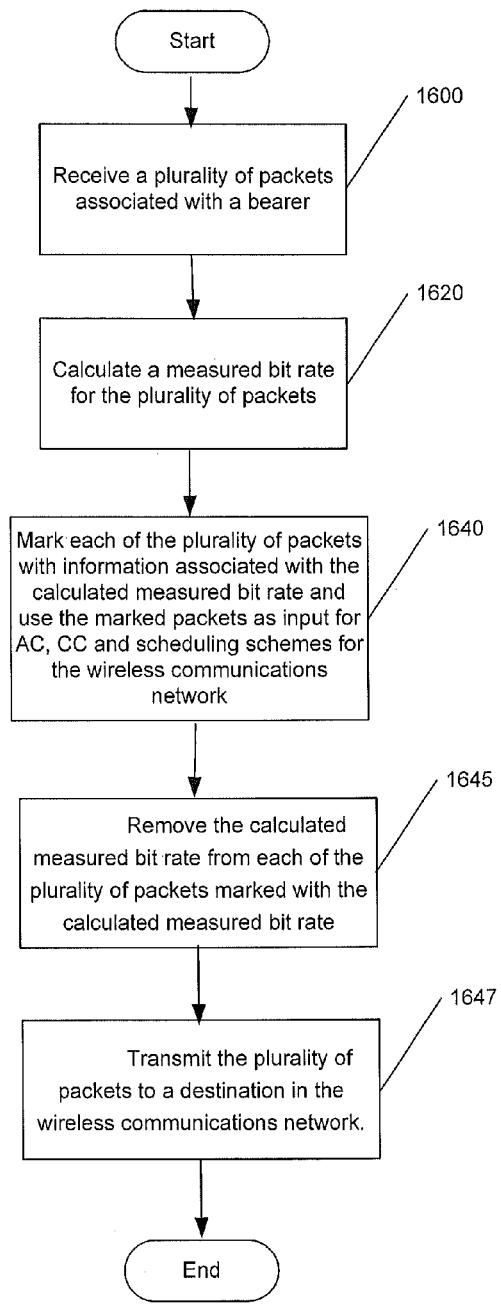

Referring now to FIG. 16, operations for load measurement for rate adaptive services in a wireless communications network begin at block 1600 by receiving a plurality of packets associated with a bearer. A measured bit rate for the plurality of packets received is calculated (block 1620). Each of the plurality of packets received is marked with information associated with the calculated measured bit rate (block 1640). As discussed above, the marking may include the actual calculated bit rate or a representation thereof, for example, a flag. The marked packets may be used as input for admission control, congestion control and/or scheduling schemes for the wireless communications network (block 1640). Once the marked packets are used for the load measurement schemes, the markings may be removed from the plurality of packets (block 1665) and the plurality of packets may be transmitted to a destination wireless communications network (block 1647).

Various embodiments were described herein with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, when an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Furthermore, "coupled", "connected", "responsive", or variants thereof as used herein may include wirelessly coupled, connected, or responsive. Like numbers refer to like elements throughout. The terminology used herein is for the purpose of describing particular embodiments only and is not intended to be limiting of the invention. As used herein, the singular forms "a", "an" and "the" are intended to include the plural forms as well, unless the context clearly indicates otherwise. Well-known functions or constructions may not be described in detail for brevity and/or clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. Moreover, as used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

As used herein, the term Radio Access Technology (RAT) may include, for example, operations in any of the following Radio Access Technologies: Advanced Mobile Phone Service (AMPS), ANSI-136, Global Standard for Mobile (GSM) communication, General Packet Radio Service (GPRS), enhanced data rates for GSM evolution (EDGE), DCS, PDC, PCS, code division multiple access (CDMA), wideband-CDMA, CDMA2000, Universal Mobile Telecommunications System (UMTS), 3GPP LTE ($3^{rd}$ Generation Partnership Project Long Term Evolution) and/or 3GPP LTE-A (LTE Advanced). For example, GSM operation can include reception/transmission in frequency ranges of about 824 MHz to about 849 MHz and about 869 MHz to about 894 MHz. EGSM operation can include reception/transmission in frequency ranges of about 880 MHz to about 914 MHz and about 925 MHz to about 960 MHz. DCS operation can include transmission/reception in frequency ranges of about 1710 MHz to about 1785 MHz and about 1805 MHz to about 1880 MHz. PDC operation can include transmission in frequency ranges of about 893 MHz to about 953 MHz and about 810 MHz to about 885 MHz. PCS operation can include transmission/reception in frequency ranges of about 1850 MHz to about 1910 MHz and about 1930 MHz to about 1990 MHz. 3GPP LTE operation can include transmission/reception in frequency ranges of about 1920 MHz to about 1980 MHz and about 2110 MHz to about 2170 MHz. Other Radio Access Technologies and/or frequency bands can also be used in embodiments according to the invention.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, if used herein, the common abbreviation "e.g.", which derives from the Latin phrase exempli gratia, may be used to introduce or specify a general example or examples of a previously mentioned item, and is not intended to be limiting of such item. If used herein, the common abbreviation "i.e.", which derives from the Latin phrase id est, may be used to specify a particular item from a more general recitation.

Exemplary embodiments were described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit such as a digital processor, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments were disclosed herein, in connection with the following description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

For purposes of illustration and explanation only, various embodiments of the present invention were described herein in the context of user equipment (e.g., "wireless user terminal(s)", "wireless communication terminal(s)", "wireless terminal(s)", "terminal(s)", "user terminal(s)", etc.) that are configured to carry out cellular communications (e.g., cellular voice and/or data communications). It will be understood, however, that the present invention is not limited to such embodiments and may be embodied generally in any wireless communication terminal that is configured to transmit and receive according to one or more RATs. Moreover, "user equipment" is used herein to refer to one or more pieces of user equipment. Acronyms "UE" and "UEs" may be used to designate a single piece of user equipment and multiple pieces of user equipment, respectively.

As used herein, the term "user equipment" includes cellular and/or satellite radiotelephone(s) with or without a multi-line display; Personal Communications System (PCS) terminal(s) that may combine a radiotelephone with data processing, facsimile and/or data communications capabilities; Personal Digital Assistant(s) (PDA) or smart phone(s) that can include a radio frequency transceiver and a pager, Internet/Intranet access, Web browser, organizer, calendar and/or a global positioning system (GPS) receiver; and/or conventional laptop (notebook) and/or palmtop (netbook) computer(s) or other appliance(s), which include a radio frequency transceiver. As used herein, the term "user equipment" also includes any other radiating user device that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). Finally, the terms "node" or "base station" includes any fixed, portable and/or transportable device that is configured to communicate with one or more user equipment and a core network, and includes, for example, terrestrial cellular base stations (including microcell, picocell, wireless access point and/or ad hoc communications access points) and satellites, that may be located terrestrially and/or that have a trajectory above the earth at any altitude.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of load measurement for rate adaptive services in a wireless communications network, the method comprising:
   receiving a plurality of packets associated with a bearer;
   calculating a measured bit rate for the plurality of packets received;
   marking each of the plurality of packets received with information associated with the calculated measured hit rate, wherein the marked packets are used as input for admission control, congestion control and/or scheduling schemes for the wireless communications network; and
   calculating resource block usage based on a modified sum of physical resource block (PRB) consumption for rate adaptive services using the marked packets and the calculated measured bit rates therein and a guaranteed bit rate (GBR) for the bearer,
   wherein the modified sum of PRB consumption is calculated using the following equation:

Modified $G_i = \Sigma(\text{PRB consumption of packets } j \text{ if } BR_j \leq GBRi)(j=1,2\ldots k)$, wherein the Modified $G_i$ is a number of PRBs used for a bearer i, where $BR_j$ is the calculated marked bit rate for packet j, and GBRi is a guaranteed bit rate for the bearer i; and
   wherein the receiving, the calculating, the marking and the calculating are performed by at least one device in the wireless communications network.

2. The method of claim 1, wherein calculating a measured bit rate for the plurality of packets received comprises using a token bucket algorithm with rate guaranteed bit rate i (GBRi), the method further comprising marking non-conformant packets with a flag related to the GBRi.

3. The method of claim 1, wherein calculating a measured hit rate for the plurality of packets received comprises feeding the packet sizes into a filter configured to provide a moving average of a size of the plurality of packets.

4. The method of claim 3, wherein calculating a measured bit rate for the plurality of packets received comprises calculating the measured bit rate ($R_m$) for a predetermined time period using the following equation:

$R_m = \Sigma L_i / t_m (i=1,2\ldots n)$, wherein $L_i$ is a size of an ith packet and $t_m$ is the predetermined time period.

5. The method of claim 3, wherein calculating a measured bit rate for the plurality of packets received comprises a filter Rm=a*Li+(1−a)Rm−1.

6. The method of claim 1, wherein the GBRi is a required bit rate needed to fulfill a guaranteed quality of service for bearer i.

7. The method of claim 1, further comprising calculating resource block usage using the following equation:

Ratio$_{PRB}$=ΣModified G$_i$/G$_{tot}$ wherein Ratio$_{PRB}$ is the resource block usage, Modified G$_i$ is the PRB consumption for the rate adaptive services and G$_{tot}$ is a total number of PRBs available in a cell of the wireless communications system.

8. The method of claim 3, further comprising calculating a modified resource block usage using the following equation:

Modified Ratio$_{PRB}$=Ratio$_{BR}$*Ratio$_{PRB}$, wherein Modified Ratio$_{PRB}$ is the modified resource block usage, wherein Ratio$_{PRB}$ is a resource block usage and Ratio$_{BR}$ is calculated using the following equation:

$$Ratio_{BR} = \begin{cases} 1 & \text{if } BR_i <= GBR_i \\ GBR_i/BR_i & \text{if } BR_i > GBR_i \end{cases}$$

wherein BR$_i$ is the measured bit rate for a bearer i and GBR$_i$ is a guaranteed bit rate a bearer i.

9. The method of claim 8, further comprising calculating the resource block usage (Ratio$_{PRB}$) using the following equation:

Ratio$_{PRB}$=ΣG$_i$/G$_{tot}$ wherein G$_{tot}$ is a total number of PRBs available in a cell of the wireless communications system and G$_i$ is a number of PRBs used for bearer i and is calculated using the following equation:

G$_i$=Σ(PRB consumption of packet j)(j=1 ... K).

10. The method of claim 1, further comprising performing bearer based congestion control based on an age of a packet, wherein the age of the packet is determined as an oldest packet in a queue having the calculated measured hit rate less than a guaranteed bit rate (GBR) for the bearer.

11. The method of claim 1, further comprising:
removing the calculated measured hit rate from each of the plurality of packets marked with the calculated measured bit rate; and then
transmitting the plurality of packets to a destination in the wireless communications network.

12. A congestion control system for rate adaptive services in a wireless communications system, the congestion control system comprising:
a radio transceiver configured to receive a plurality of packets associated with a bearer; and
a processor configured to:
calculate a measured bit rate for the plurality of packets received;
mark each of the plurality of packets with information associated with the calculated measured bit rate, wherein the marked packets are used as input for admission control, congestion control and/or scheduling schemes for the wireless communications network; and
calculate resource block usage based on a modified sum of physical resource block (PRB) consumption for rate adaptive services using the marked packets and the calculated measured bit rates therein and a guaranteed bit rate (GBR) for the bearer, wherein the modified sum of PBR consumption is calculated using the following equation:

Modified G$_i$=Σ(PRB constitution of packets j if BRj≤GBRi)(j=1,2 ... k), wherein the Modified G$_i$ is a number of PRBs used for a bearer i, where BR$_j$ is the calculated marked bit rate for packet j, and GBRi is a guaranteed bit rate for the bearer i.

13. The system of claim 12, the processor is further configured to calculate the measured hit rate (R$_m$) for a predetermined time period using the following equation:

R$_m$=ΣLi/t$_m$(i=1,2 ... n), wherein L$_i$ is a size of an ith packet and t$_m$ is the predetermined time period.

14. The system of claim 12, wherein the processor is further configured to calculate resource block usage using the following equation:

Ratio$_{PRB}$=ΣModified G$_i$/G$_{tot}$ wherein Ratio$_{PRB}$ is the resource block usage, Modified G$_i$ is the PRB consumption for the rate adaptive services and G$_{tot}$ is a total number of PRBs available in a cell of the wireless communications system.

15. The system of claim 12, wherein the processor is further configured to calculate a modified resource block usage using the following equation:

Modified Ratio$_{PRB}$=Ratio$_{BR}$*Ratio$_{PRB}$, wherein Modified Ratio$_{PRB}$ is the modified resource block usage, wherein Ratio$_{PRB}$ is a resource block usage and Ratio$_{BR}$ is calculated using the following equation:

$$Ratio_{BR} = \begin{cases} 1 & \text{if } BR_i <= GBR_i \\ GBR_i/BR_i & \text{if } BR_i > GBR_i \end{cases}$$

wherein BR$_i$ is the measured bit rate for a bearer i and GBR$_i$ is a guaranteed bit rate a bearer i.

16. The system of claim 15, wherein the processor is further configured to calculate the resource block usage (Ratio$_{PRB}$) using the following equation:

Ratio$_{PRB}$=ΣG$_i$/G$_{tot}$ wherein G$_{tot}$ is a total number of PRBs available in a cell of the wireless communications system and G$_i$ is a number of PRBs used for bearer i and is calculated using the following equation:

G$_i$=Σ(PRB consumption of packet j)(j=1 ... K).

17. The system of claim 12, wherein the processor is further configured to perform bearer based congestion control based on an age of a packet, wherein the age of the packet is determined as an oldest packet in a queue having the calculated measured bit rate less than a guaranteed bit rate (GBR) for the bearer.

18. The system of claim 12, wherein the load measurement device is part of a node or a gateway of the wireless communications system.

19. A computer program product for load measurement for rate adaptive services in a wireless communications network, the computer program product comprising:
a non-transitory computer readable storage medium including computer readable program code embodied therein, the computer readable program code comprising:
computer readable program code configured to receive a plurality of packets associated with a bearer;
computer readable program code configured to calculate a measured bit rate for the plurality of packets received;
computer readable program code configured to mark each of the plurality of packets received with the information associated with the calculated measured bit rate, wherein the marked packets are used as input for admission control, congestion control and/or scheduling schemes for the wireless communications network; and computer readable program code configured to calculate resource block usage based on a modified sum of physical resource block (PRB) consumption for rate adaptive services using the marked packets and the calculated measured bit rates therein and a guaranteed bit rate (GBR) for the packet flow, wherein the modified sum of PBR consumption is calculated using the following equation:

Modified $G_i = \Sigma$(PRB consumption of packets $j$ if $BRj \leq GBRi$)($j=1,2\ldots k$), wherein the Modified $G_i$ is a number of PRBs used for a bearer i, where $BR_j$ is the calculated marked bit rate for packet j, and GBRi is a guaranteed hit rate for the bearer i.

20. The computer program product of claim 19, wherein the computer readable program code configured to calculate comprises computer readable program code configured to calculate the measured bit rate ($R_m$) for a predetermined time period using the following equation:

$R_m = \Sigma Li/t_m (i=1,2\ldots n)$, wherein $L_i$ is a size of an ith packet and $t_m$ is the predetermined time period.

21. The computer program product of claim 19, further comprising computer readable program code configured to calculate resource block usage using the following equation:

$Ratio_{PRB} = \Sigma$Modified $G_i/G_{tot}$ wherein $Ratio_{PRB}$ is the resource block usage, Modified $G_i$ is the PRB consumption for the rate adaptive services and $G_{tot}$ is a total number of PRBs available in a cell of the wireless communications system.

22. The computer program product of claim 19, further comprising computer readable program code configured to calculate a modified resource block usage using the following equation:

Modified $Ratio_{PRB} = Ratio_{BR} * Ratio_{PRB}$, wherein Modified $Ratio_{PRB}$ is the modified resource block usage, wherein $Ratio_{PRB}$ is a resource block usage and $Ratio_{BR}$ is calculated using the following equation:

$$Ratio_{BR} = \begin{cases} 1 & \text{if } BR_i <= GBR_i \\ GBR_i/BR_i & \text{if } BR_i > GBR_i \end{cases}$$

wherein $BR_i$ is the measured bit rate for a hearer i and $GBR_i$ is a guaranteed bit rate a bearer i.

23. The computer program product of claim 22, further comprising computer readable program code configured to calculate the resource block usage ($Ratio_{PRB}$) using the following equation:

$Ratio_{PRB} = \Sigma G_i/G_{tot}$ wherein $G_{tot}$ is a total number of PRBs available in a cell of the wireless communications system and $G_i$ is a number of PRBs used for bearer i and is calculated using the following equation:

$G_i = \Sigma$(PRB consumption of packet $j$)($j=1\ldots K$).

24. The computer program product of claim 19, further comprising computer readable program code configured to perform hearer based congestion control based on an age of a packet, wherein the age of the packet is determined as an oldest packet in a queue having the calculated measured bit rate less than a guaranteed hit rate (GBR) for the bearer.

* * * * *

UNITED STATES PATENT AND TRADEMARK OFFICE
CERTIFICATE OF CORRECTION

PATENT NO. : 8,750,113 B2
APPLICATION NO. : 13/280592
DATED : June 10, 2014
INVENTOR(S) : Wang et al.

It is certified that error appears in the above-identified patent and that said Letters Patent is hereby corrected as shown below:

In the Drawings

In Fig. 16, Sheet 9 of 9, delete Tag "1645" and insert Tag -- 1665 --, therefor.

In the Specification

Column 3, Line 24, delete "12" and insert -- f2 --, therefor.

Column 3, Line 27, delete "12" and insert -- f2 --, therefor.

Column 8, Line 22, in Equation (3), delete "Gi=(PRB consumption" and insert -- Gi=$\sum$(PRB consumption --, therefor.

Column 8, Line 29, in Equation (4), delete "GBR)" and insert -- $GBR_i$) --, therefor.

In the Claims

Column 14, Line 25, in Claim 1, delete "hit" and insert -- bit --, therefor.

Column 14, Line 51, in Claim 3, delete "hit" and insert -- bit --, therefor.

Column 14, Line 59, in Claim 4, delete " $R_m - \sum L_i / t_m (i=1,2...n)$," and insert -- $R_m = \sum L_i / t_m (i=1,2...n)$, --, therefor.

Column 15, Line 37, in Claim 10, delete "hit" and insert -- bit --, therefor.

Column 15, Line 40, in Claim 11, delete "hit" and insert -- bit --, therefor.

Signed and Sealed this
Eleventh Day of November, 2014

Michelle K. Lee
*Deputy Director of the United States Patent and Trademark Office*

CERTIFICATE OF CORRECTION (continued)
U.S. Pat. No. 8,750,113 B2

Column 15, Line 66, in Claim 12, delete "Modified $G_i=\sum$(PRB constitution" and insert -- Modified $G_i=\sum$(PRB consumption --, therefor.

Column 16, Line 5, in Claim 13, delete "hit" and insert -- bit --, therefor.

Column 16, Line 8, in Claim 13, delete "$R_m\text{-}\sum Li/t_m (i=1,2\ldots n),$," and insert -- $R_m=\sum Li/t_m (i=1,2\ldots n),$ --, therefor.

Column 17, Line 18, in Claim 19, delete "hit" and insert -- bit --, therefor.

Column 17, Line 24, in Claim 20, delete "$R_m\text{-}\sum Li/t_m (i=1,2\ldots n),$" and insert -- $R_m=\sum Li/t_m (i=1,2\ldots n),$ --, therefor.

Column 18, Line 15, in Claim 22, delete "hearer" and insert -- bearer --, therefor.

Column 18, Line 31, in Claim 24, delete "hearer" and insert -- bearer --, therefor.

Column 18, Line 34, in Claim 24, delete "hit" and insert -- bit --, therefor.